United States Patent [19]
Johansson

[11] Patent Number: 5,420,901
[45] Date of Patent: May 30, 1995

[54] LOWER TIE PLATE DEBRIS CATCHER FOR A NUCLEAR REACTOR

[76] Inventor: Eric B. Johansson, 2400 Lumina Ave. Unit 3204, Wrightsville Beach, N.C. 28480

[21] Appl. No.: 274,519

[22] Filed: Jul. 13, 1994

[51] Int. Cl.⁶ .................. G21C 3/30; G21C 15/02; G21C 19/00
[52] U.S. Cl. .................... 376/352; 376/313; 376/440; 376/439
[58] Field of Search ............... 376/352, 313, 440, 439, 376/443

[56] References Cited

U.S. PATENT DOCUMENTS

| | | | |
|---|---|---|---|
| 4,039,379 | 8/1977 | Patterson et al. | 376/439 |
| 4,655,995 | 4/1987 | Freeman et al. | 376/267 |
| 4,781,884 | 11/1988 | Anthony | 376/439 |
| 5,106,575 | 1/1992 | Nakamura et al. | 376/443 |
| 5,282,231 | 1/1994 | Adams et al. | 376/352 |

FOREIGN PATENT DOCUMENTS

| | | | |
|---|---|---|---|
| 1276225 | 8/1968 | Germany | 376/352 |
| 1105238 | 3/1968 | United Kingdom | 376/352 |

*Primary Examiner*—Behrend E. Harvey
*Attorney, Agent, or Firm*—J. E. McGinness

[57] ABSTRACT

A unitary one-piece lower tie plate grid has a lower portion and an upper portion for supporting the fuel rods. The lower tie plate grid includes cylindrical boss portions arranged in square matrices for receiving the lower end plugs of the fuel rods. Web portions interconnect the boss portions along the sides of the matrices. The lower grid portion includes a plurality of openings which open into the flow spaces defined by the convex portions of the bosses and the webs within each square matrix of the upper portion of the tie plate. Coolant flows through the lower flow openings into the flow spaces for further flow upwardly about the fuel rods. The openings are defined by the convex lower portions of the bosses and webs, as well as projections which extend laterally inwardly from the convex surfaces of the lower boss portions toward a central region in the middle of the square matrix. The projections are cylindrical and terminate short of one another to define a generally cloverleaf-shaped flow opening having multi-lobes which, in conjunction with the projections, catch debris while maintaining coolant flow into the flow spaces above the projections at minimum pressure drop.

13 Claims, 4 Drawing Sheets

LOWER TIE PLATE DEBRIS CATCHER FOR A NUCLEAR REACTOR

TECHNICAL FIELD

The present invention relates to a lower tie plate grid for a nuclear reactor fuel bundle and particularly relates to a lower tie plate grid forming part of a lower tie plate assembly wherein the grid has a lower portion with a plurality of laterally extending projections for partially occluding flow channels through the grid to separate debris from the flow of water coolant through the tie plate with minimum water coolant pressure loss.

BACKGROUND

Boiling water nuclear reactors have been in operation for many years. Commencing with their initial construction and throughout their service lives, these reactors may accumulate debris in their closed circulation moderator systems. This debris can become an operating hazard if the debris is allowed to enter into the fuel bundle core region containing the heat generating fuel rods. In order to understand this problem, a summary of reactor construction as it relates to the accumulation of debris in the core needs first to be given. Thereafter, fuel bundle construction will be set forth. Emphasis will be given to the need to preserve substantially unchanged the regions of pressure drop within the fuel bundles. Thereafter, the effects caused by debris entering into the fuel rod region of the fuel bundles will be summarized.

In boiling water nuclear reactor construction, the reactor is provided with a large, central core. Liquid water coolant/moderator flow enters the core from the bottom and exits the core as a water steam mixture from the top. The core includes many side-by-side fuel bundles, each containing a plurality of fuel rods. Water is introduced into each fuel bundle through a fuel bundle support casting from a high pressure plenum situated below the core. Water passes in a distributed flow through the individual fuel bundles and about the fuel rods, is heated to generate steam, and exits the upper portion of the core as a two-phase water steam mixture from which the steam is extracted for the generation of energy.

The core support castings and fuel bundles are a source of pressure loss in the circulation of water through the core. By properly controlling such pressure losses substantially even distribution of flow across the individual fuel bundles of the reactor core is achieved. When it is remembered that there are as many as 750 individual fuel bundles in a reactor core, it can be appreciated that assurance of the uniformity of flow distribution is important. To interfere with the pressure drop within the fuel bundles could affect the overall distribution of coolant/moderator within the fuel bundles of the reactor core.

The fuel bundles for a boiling water nuclear reactor include a fuel rod supporting lower tie plate assembly. Typically, this is a one-piece cast structure including an upper grid, a lower inlet nozzle and a structure providing a transition region from the inlet to the grid. The inlet nozzle provides for coolant entry to an enlarged flow volume within the flow transition region of the lower tie plate assembly. At the upper end of the flow volume, there is located a tie plate grid defining with the nozzle a flow volume. The tie plate grid has two purposes. First, it provides the mechanical support connection for the weight of the individual fuel rods to be transmitted through the entire lower tie plate assembly to the fuel support casting. Secondly, the tie plate grid provides a path for liquid water moderator to flow into the fuel bundle for passage between the side-by-side supported fuel rods.

Above the lower tie plate grid, each fuel bundle includes a matrix of upstanding fuel rods—sealed tubes each containing fissionable material which when undergoing nuclear reaction transfers energy to the flowing water to produce the power generating steam. The matrix of upstanding fuel rods includes at its upper end an upper tie plate assembly. This upper tie plate assembly holds at least some of the fuel rods in vertical side-by-side alignment. Some of the fuel rods are attached to both the upper and lower tie plate assemblies. Usually, water rods are also included between the upper and lower tie plate assemblies for improvement of the water moderator to fuel ratio, particularly in the upper region of the fuel bundle.

Fuel bundles also include a number of fuel rod spacers at varying elevations along the length of the fuel bundle. These spacers are required because the fuel rods are long (about 160 inches) and slender (about 0.4 to 0.5 inches in diameter), and would come into abrading contact under the dynamics of fluid flow and nuclear power generation within the fuel bundles. The spacers provide appropriate lateral restraints for each fuel rod at their respective elevations and thus prevent abrading contact between the fuel rods and maintain the fuel rods at uniform spacing relative to one another along the length of the fuel bundle for optimum performance. It will be appreciated that these spacers are sites where debris can be trapped and damage the fuel rods.

Each fuel bundle is surrounded by a channel. This channel causes water flowing between the upper and lower tie plate assemblies to be restricted to only one bundle in an isolated flow path between the tie plate assemblies. The channel also serves to separate the steam generating flow path through the fuel bundles from the surrounding core bypass region, this region being utilized for the penetration of the control rods. The water in the bypass region also provides neutron moderation.

In the operation of a boiling water nuclear reactor, maintenance of the originally designed flow distribution is very important. Specifically, from the lower (high pressure) plenum inlet to the core to the outlet from the core of the steam and water mixture through the upper tie plate assemblies of the fuel bundles, about 20 pounds per square inch (psi) of the pressure drop is encountered at typical flow operating conditions. About 7 to 8 psi of this pressure drop occurs through the fuel support casting. This pressure drop is mainly to assure the uniform distribution of coolant/moderator flow through the many fuel bundles making up the core of the reactor and is related to the prevention of operating instabilities within the reactor at certain power rates. At the lower tie plate assembly of each fuel bundle, from the inlet nozzle into the flow volume and through the tie plate grid, about 1 to 1¼ psi pressure drop occurs which contributes to establishing flow distribution between the individual fuel rods of each fuel bundle. Finally, through the fuel bundle itself—from the exit of the lower tie plate assembly to the exit at the upper tie plate assembly—about 11 psi of pressure drop usually occurs. When new fuel bundles are introduced into a reactor core, these pressure drops must be preserved. Otherwise, the coolant/moderator flow distribution could be compromised.

With respect to the tie plate grid of the lower tie plate assembly, a matrix of cylindrical bosses and webs generally form the grid. The bosses are sized to receive the fuel rod end plugs. The spacing and thickness of the bosses and webs are primary factors in controlling pressure drop resulting from water flow through the grid.

In early grid constructions, since the fuel rods had greater cross-sectional diameters, the bosses were large. In more recent grid constructions, since the fuel rods have smaller cross-sectional diameters, the bosses are smaller. Also, in early constructions, fewer fuel rods formed a fuel bundle than in recent constructions.

Even with all of these changes in grid and bundle construction, however, it is necessary to avoid significantly altering pressure drop. For example, a core may be composed of older (8×8) bundles and newer (11×11) bundles, and the pressure drop through each bundle preferably is uniform. One challenge with new fuel bundle constructions, and particularly, lower tie plate grid constructions, is to accommodate more fuel rods and perform debris catching functions yet maintain a pressure drop equivalent to the pressure drop resulting from older bundle constructions.

Typically, debris within boiling water nuclear reactors can include extraneous materials left over from reactor construction, debris liberated from corrosion during the reactor lifetime, and during the numerous outages and repairs, further debris accumulates. Because nuclear reactors constitute closed circulation systems, it will be appreciated that debris will essentially accumulate with increasing age and use of the reactor. A particularly vexing and usual place for the accumulation of debris is in the fuel bundles between the fuel rods, particularly in the vicinity of the fuel rod spacers. It will be recalled that each fuel rod is surrounded by a spacer at the particular elevation of the spacer. Debris particles tend to lodge between the spacer structure and the fuel rods and often dynamically vibrate with the coolant/moderator flow in abrading contact to the sealed cladding of the fuel rods.

SUMMARY OF THE INVENTION

The present invention provides a lower tie plate assembly including a debris catcher forming part of a grid. The grid has lower and upper portions, the lower portion serving to catch debris above a predetermined size, while simultaneously providing minimal pressure drop of water coolant through the grid. The grid also supports the fuel rods in a manner enabling a smooth, substantially uniform expansion of the flow into the fuel bundle. To accomplish the latter, a plurality of laterally spaced, generally cylindrical bosses, defining through openings, extend between upper and lower surfaces of the lower tie plate grid and receive lower ends of the fuel rods. Webs also extend substantially between those surfaces and interconnect the bosses. The bosses and webs include respective portions thereof which extend upwardly from the lower portion of the grid and lie substantially coextensively with the upper portion of the grid to define in the upper grid portion a plurality of flow spaces. The bosses are arranged on vertical centerlines disposed at the corners of square matrices, with the webs extending linearly between the bosses along the sides of the square matrices. Convex portions of the cylindrical bosses extend between the right angularly related webs of each matrix. Thus, the webs and the convex portions of the bosses of the upper portion of the lower tie plate grid define the flow spaces.

The lower grid portion also includes lower web portions and boss portions which, together with laterally extending projections define a plurality of openings extending through the lower grid portion and opening into the flow spaces. These laterally extending projections in conjunction with the lower web and boss portions separate debris above a certain size from the water flowing through these openings into the flow spaces between the boss and web portions in the upper grid portion. In order to minimize the pressure loss and maximize the debris catching function, the openings are specifically oriented, shaped and dimensioned. Particularly, each opening is defined by lower web portions and lower boss portions with the boss portions having projections extending laterally and radially from the boss portions toward a central region of the lower opening and which projections terminate short of a central region. Thus, the projections extend from the convex surfaces of the lower boss portions at each of the four corners of the square matrix defining the locations of the bosses. Those projections extend diagonally from opposite corners of the square matrix and toward one another to define a generally multi-lobed opening having an approximate cloverleaf configuration. Preferably, the projections comprise laterally extending cylindrical rods or pins terminating in hemispherical ends. In this manner, the upper and lower surfaces of the projections are arcuate as well as their ends, thereby facilitating the transition of coolant flow through the openings into the flow spaces in the upper portion of the grid.

In a preferred embodiment, the openings are asymmetrical. That is, the projections from a first pair of diagonally opposite convex surfaces of lower boss portions are longer than the second pair of projections along the other diagonally opposite convex surfaces of the lower boss portions which form the corners of the square matrix of bosses. Consequently, the openings through the lower grid portion are symmetrical about each diagonal, with the symmetries of the respective diagonals being different than one another. While in a preferred form the projections extend from the convex surfaces of the lower boss portions, the projections may also extend from the lower web portions, although an increase in pressure drop for separating a given debris size may occur in comparison to the pressure drop with the projections extending from the bosses for the same debris size.

In a preferred embodiment according to the present invention, there is provided in a nuclear fuel assembly, a lower tie plate grid comprising a lower grid portion and an upper grid portion, means for supporting fuel rods above the lower tie plate grid including the upper and lower grid portions, the supporting means comprising a plurality of laterally spaced bosses sized for receiving lower ends of nuclear fuel rods, the bosses having portions extending upwardly from the lower grid portion. The supporting means further include webs interconnecting the bosses and having portions extending upwardly from the lower grid portion to define with the boss portions a plurality of flow spaces in the upper grid portion extending from the lower grid portion and opening through an upper surface of the lower tie plate grid, the bosses being cylindrical and having vertical centerlines arranged at the corners of square matrices with the webs extending linearly between the bosses along sides of the square matrices, convex portions of the cylindrical bosses extending between perpendicularly oriented webs of each matrix, the bosses and webs having lower boss and web portions, respectively, in the lower grid portion. The lower grid portion of the lower tie plate grid includes a plurality of lower openings extending therethrough defined in part by the lower boss portions and the lower web portions and opening into the flow spaces for separating debris from a coolant flowing through the lower grid portion into the flow spaces between the upper boss portions and the upper web portions. Each lower opening being defined in further part by a plurality of projections extending laterally from the lower boss portions or the lower web portions toward a central region of the lower opening and terminating short of the central region.

Accordingly, it is a primary object of the present invention to provide a novel and improved lower tie plate grid for supporting a nuclear fuel bundle and having a lower portion for limiting the passage of debris in the moderator coolant flow through the tie plate grid with minimal pressure drop.

BEST MODE FOR CARRYING OUT THE INVENTION

Figure 1:
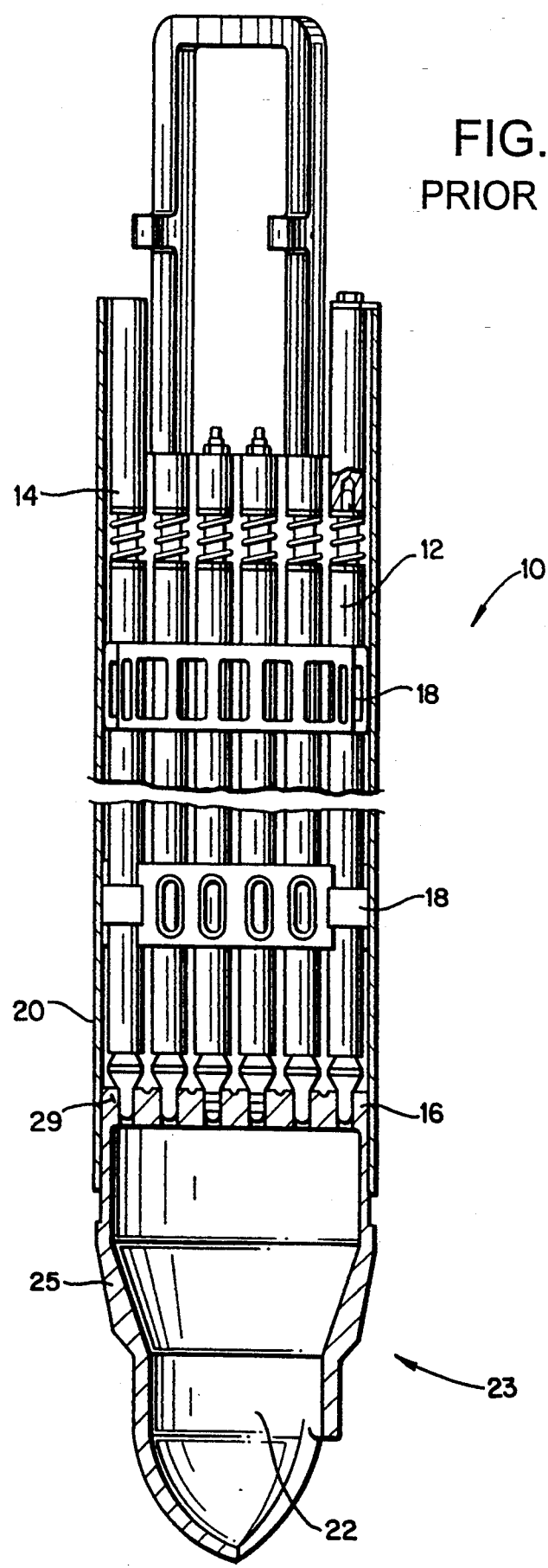
FIG. 1 is a vertical cross-sectional view of a conventional fuel assembly illustrating a nuclear fuel bundle supported on a lower tie plate assembly.

Referring now to the representative example of a fuel assembly, generally designated 10 in FIG. 1, there is illustrated a plurality of nuclear fuel rods 12 forming a nuclear fuel bundle. The rods 12 are connected at their upper ends to an upper tie plate 14 and are supported at their lower ends in a lower tie plate grid, generally designated 16, forming part of a tie plate assembly, generally designated 23. Spacers 18 are arranged at a plurality of vertically spaced locations to maintain lateral spacing of the fuel rods 12 relative to one another. The fuel bundle is disposed within a fuel bundle channel 20. Coolant water enters through the bottom noble or inlet opening 22 of the tie plate assembly 23 and flows upwardly therefrom through a transition structure 25 defining an enlarged flow volume 27. The coolant then flows through the lower tie plate grid 16 and about the fuel rods within channel 20 whereby steam is generated. As indicated previously, it is important that debris in the flow of the coolant water be prevented from flowing into the area between the fuel rods. Accordingly, a lower tie plate assembly 23 including a lower tie plate grid 16, preferably of a unitary one-piece construction, and serving the dual purpose of catching debris and supporting the fuel bundle according to the present invention is described and illustrated with respect to subsequent drawing figures.

Figure 2:
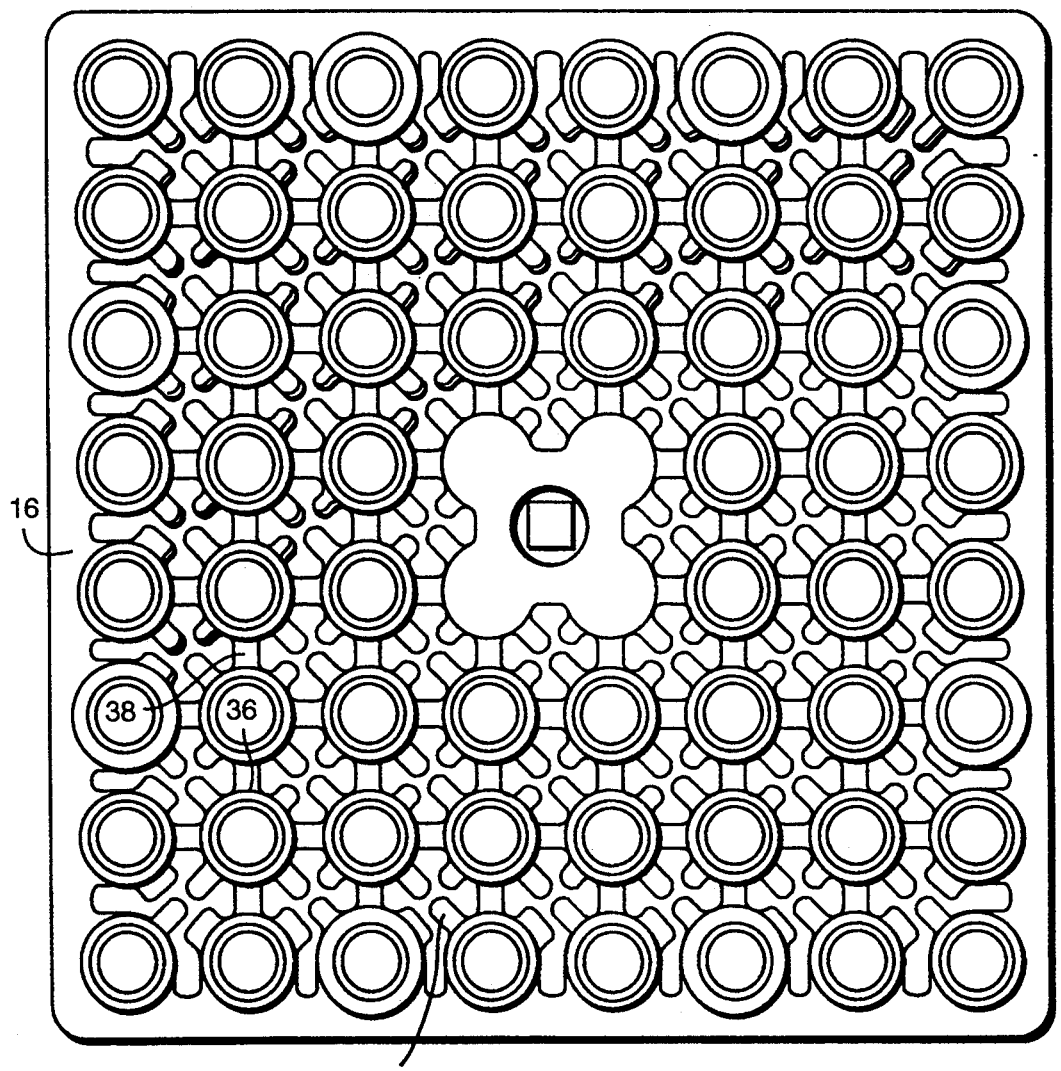
FIG. 2 is an enlarged top plan view of a lower tie plate grid constructed in accordance with the present invention.
Figure 3:
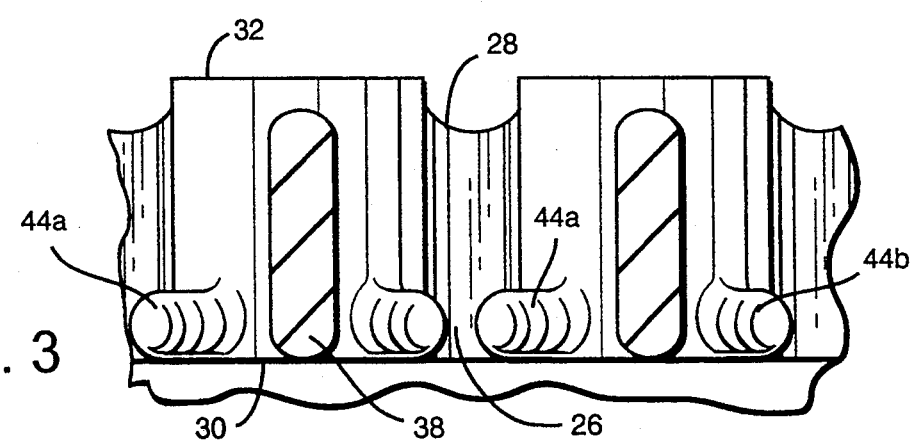
FIG. 3 is a cross-sectional view of a portion of the lower tie plate grid taken generally about on line 3—3 in FIG. 4.

Referring now to FIGS. 2 and 3, there is illustrated a lower tie plate grid 16 according to the present invention forming a part of the lower tie plate assembly 23. Lower tie plate grid 16 may be integrally cast with the lower tie plate assembly 23 but is preferably formed separately and secured thereto as by welding its depending side walls 29 to assembly 23. Lower tie plate grid 16 has a lower grid portion 26 for separating debris from the flow of water through the tie plate with minimum pressure drop and an upper grid portion 28 which, together with the lower portion, support the fuel rods above the lower tie plate grid 16. The upper portion 28 affords flow spaces which assist to minimize the pressure drop across the lower tie plate grid and enable the fluid to expand within the flow spaces uniformly and smoothly for subsequent flow about the fuel rods.

Turning first to FIG. 2, there is illustrated a plurality of generally cylindrical bosses 36 which extend between the upper and lower surfaces 30 and 32 (FIG. 3), respectively, of tie plate grid 16 for receiving the cylindrical end plugs of the nuclear fuel rods and supporting the latter. As best seen in FIG. 2, the cylindrical bosses have centerlines arranged at corners of substantially square matrices of such bosses 36. Interconnecting and forming the sides of the square matrices are webs 38 adjoining the adjacent cylindrical bosses 36 along radial lines of bosses 36. The webs may extend between the upper and lower surfaces 30, 32 of the lower tie plate grid 16 but may also terminate at their upper ends short of bosses 36 as illustrated in FIG. 3. Consequently, it will be seen that above the lower grid portion 26, the webs 38 have portions formed along the sides of each square matrix and, together with convex outer portions of the cylindrical bosses 36, define side walls of upper flow spaces 40. The lower portion 26 of grid 16 likewise has lower portions of the webs 38 and bosses 36 formed along the sides of each square matrix and which, together with projections 44 described below, form openings for flowing coolant through the lower grid portion 26 and into the flow spaces 40 where the flow expands smoothly at reduced velocity for flow upwardly about the fuel rod supported by the lower tie plate assembly.

Figure 4:
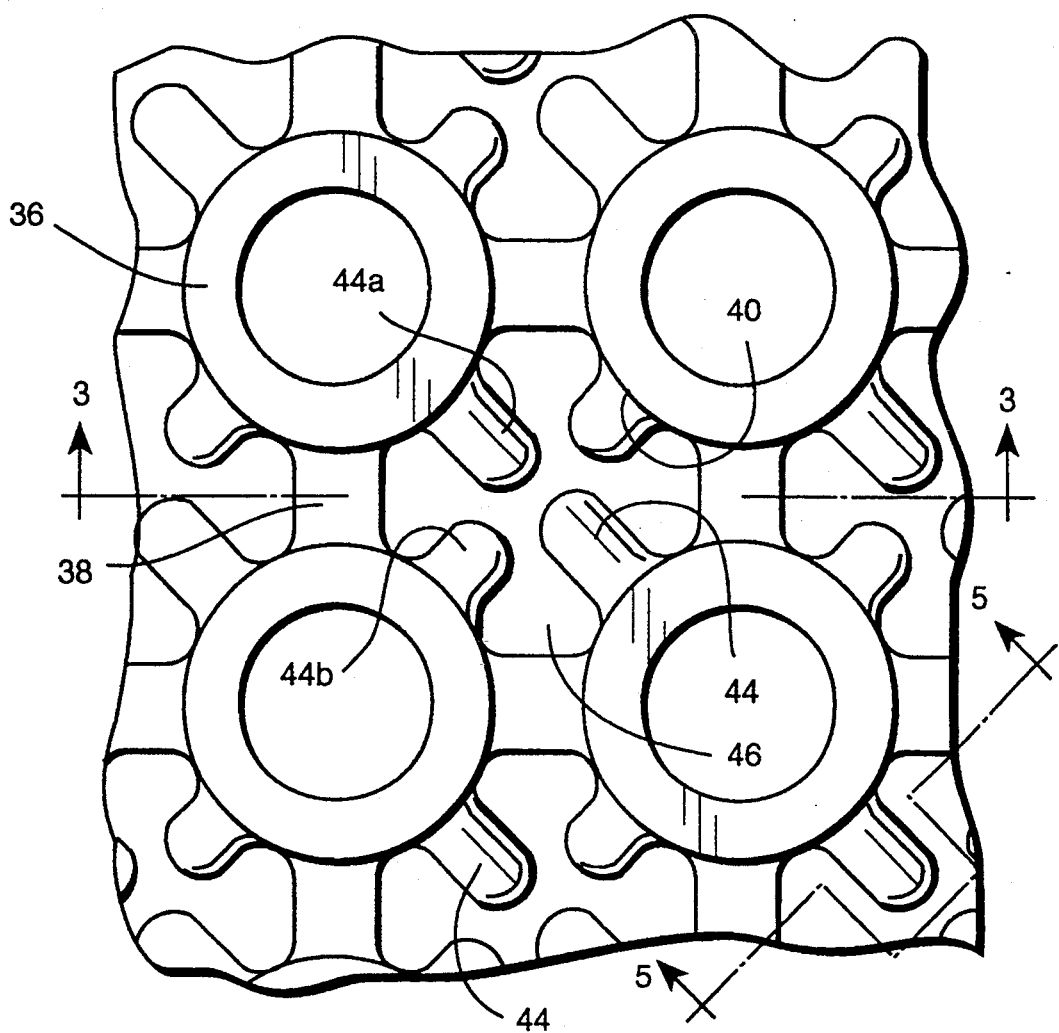
FIG. 4 is an enlarged fragmentary top plan view of the lower tie plate grid illustrating four bosses for supporting fuel rods, the flow space therebetween and an opening through the lower grid portion.
Figure 5:
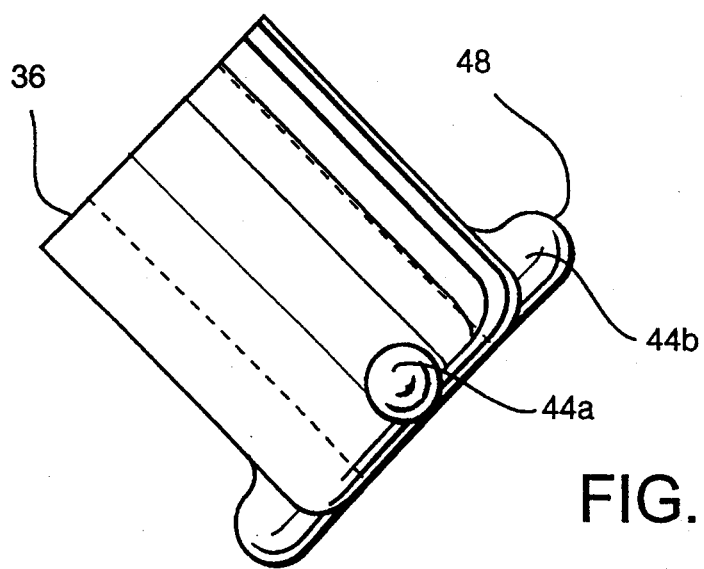
FIG. 5 is a cross-sectional view thereof taken generally about on line 5—5 in FIG. 4.

The debris catching function of the tie plate grid 16 is performed by the lower grid portion 26. To accomplish this debris catching function, lower grid portion 26 includes a plurality of projections 44 which, together with the lower portions of the webs 38 and bosses 36, define a flow opening 46 within each of the square matrices previously described. As best illustrated in FIGS. 4 and 5, the projections 44 extend laterally from the convex surfaces of the lower boss portions parallel to diagonal lines connecting the centerlines of the bosses in the square matrices. The projections 44 extend toward a central region of the lower opening 46 and terminate short of one another and the central region.

As best illustrated in FIG. 4, the projections 44a along one diagonal of the square matrices are longer than the projections 44b along the other diagonal of the square matrix. The projections thus define with the lower portions of the webs and bosses a generally cloverleaf-shaped opening, i.e., an asymmetrical multi-lobed opening. It will be appreciated that the openings are, however, symmetrical about each of the diagonal lines, albeit the symmetries are different. The different length projections are provided to minimize the pressure drop of the coolant flow through the debris catching portion of the grid, while maximizing the ability of the grid to catch debris above a certain size.

As illustrated in FIGS. 4 and 5, the projections 44 are generally cylindrical, with the axes of each cylindrical projection extending in the lateral direction as a continuation of the radius of the boss to which the projection is connected. The ends of the projections are generally bulbous in configuration, as illustrated at 48 in FIG. 5. Consequently, the upper and lower surfaces, as well as the ends of the projections, are arcuate to facilitate a smooth transition of coolant flow through the debris catching portion of the grid.

Figure 6:
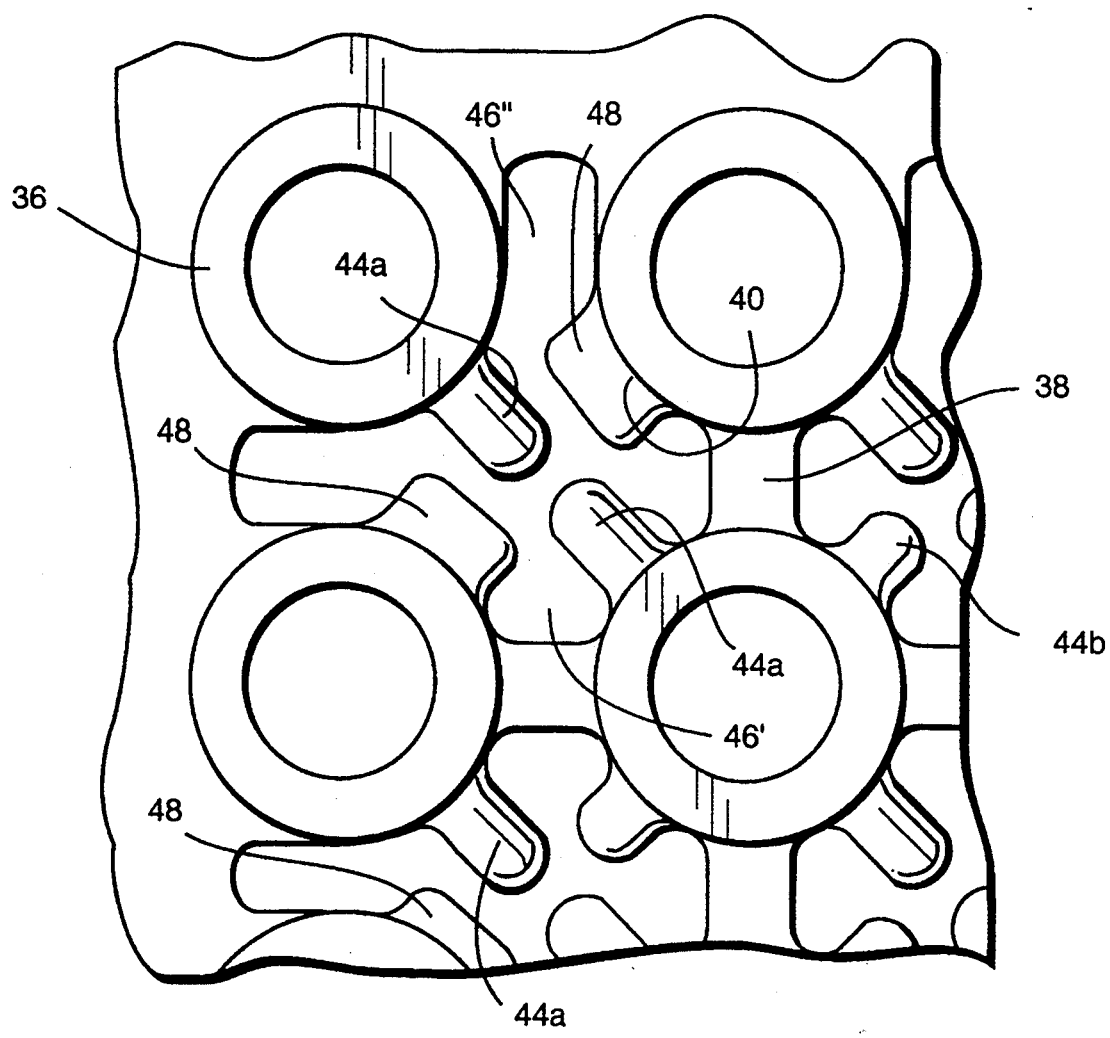
FIG. 6 is an enlarged fragmentary top plan view of the lower tie plate grid similar to FIG. 4 illustrating the flow opening along the outer periphery of the grid.

Referring now to FIGS. 2 and 6, it will be seen that the flow openings 46' formed at the corners and along the outer periphery of the grid 16 are differently shaped than the flow openings interiorly of the grid. As illustrated in FIG. 6, and at the corner of the grid 16, two of the projections, namely the two projections 44a are as previously described. The other projections 48 have a greater width and a shorter length than the projections 44b. In each peripheral flow opening other than in the corner of the grid, two projections 44a, one projection 44b and a projection 48 are provided. In the peripheral flow openings of 46', one of the lobes is extended toward the outer periphery of the grid to increase the flow area, thus reducing pressure drop while simultaneously maintaining the debris-catching function of the lower grid portion to catch debris above the predetermined size. In the corner flow openings 46'', two lobes are extended toward the adjacent sides of the grid as illustrated and for similar purposes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a nuclear fuel assembly, a lower tie plate grid comprising:

a lower grid portion and an upper grid portion;

means for supporting fuel rods above the lower tie plate grid including said upper and lower grid portions;

said supporting means comprising a plurality of laterally spaced bosses sized for receiving lower ends of nuclear fuel rods, said bosses having portions extending upwardly from said lower grid portion, said supporting means further including webs interconnecting said bosses and having portions extending upwardly from said lower grid portion to define with said boss portions a plurality of flow spaces in said upper grid portion extending from said lower grid portion and opening through an upper surface of said lower tie plate grid;

said bosses being cylindrical and having vertical centerlines arranged at the corners of square matrices with said webs extending linearly between said bosses along sides of the square matrices, convex portions of said cylindrical bosses extending between perpendicularly oriented webs of each matrix, said bosses and webs having lower boss and web portions, respectively, in said lower grid portion;

said lower grid portion of said lower tie plate grid including a plurality of lower openings extending therethrough defined in part by said lower boss portions and said lower web portions and opening into said flow spaces for separating debris from a coolant flowing through said lower grid portion into said flow spaces between said upper boss portions and said upper web portions;

each said lower opening being defined in further part by a plurality of projections extending laterally from said lower boss portions or said lower web portions toward a central region of said lower opening and terminating short of said central region.

2. A lower tie plate grid according to claim 1 wherein said lower boss portions, said lower web portions and said projections define lower openings of a generally cloverleaf configuration.

3. A lower tie plate grid according to claim 1 wherein said projections extend from said lower boss portions, said lower boss portions, said lower web portions and said projections defining lower openings having four lobes about said central region.

4. A lower tie plate grid according to claim 1 wherein, for at least certain ones of said lower openings, a first pair of projections of said plurality of projections extend laterally from a first pair of diagonally opposite lower convex boss portions of said cylindrical bosses, and a second pair of projections of said plurality of projections extend laterally from a second pair of diagonally opposite lower convex portions of said cylindrical bosses.

5. A lower tie plate grid according to claim 4 wherein said first pair of projections are longer than said second pair of projections.

6. A lower tie plate grid according to claim 5 wherein said certain ones of said lower openings are symmetrical about respective diagonal lines passing through the vertical centerlines of said bosses in said square matrix.

7. A lower tie plate grid according to claim 1 wherein said projections have generally arcuate upper and lower surfaces to enable smooth transition of coolant flow about said projections and into said flow spaces.

8. A lower tie plate grid according to claim 1 wherein said projections have distal ends having a generally hemispherical shape.

9. A lower tie plate grid according to claim 1 wherein said projections comprise circular pins having laterally extending axes.

10. A lower tie plate grid according to claim 1 wherein said grid, including said projections, is formed as an integral casting.

11. A lower tie plate grid according to claim 1 wherein said openings extend between each pair of next-adjacent lower boss portions of bosses spaced about the periphery of said grid, at least one of said projections in each said opening between said next-adjacent peripheral bosses having a width greater than the width of others of said projections in each said opening between next-adjacent peripheral bosses.

12. In a nuclear fuel assembly having a lower tie plate grid according to claim 1, a fuel rod support structure including a lower tie plate assembly comprised of an inlet nozzle, said lower tie plate grid and a transition structure defining a flow volume for receiving coolant entering said nozzle and flowing coolant to said lower tie plate grid.

13. In a nuclear fuel bundle and support therefor having a lower tie plate grid according to claim 1, upper and lower tie plate assemblies, a nuclear fuel bundle between said upper and lower tie plate assemblies and including a plurality of nuclear fuel rods, said lower tie plate assembly including said lower tie plate grid for supporting said nuclear fuel bundle.

* * * * *